US012596267B2

(12) United States Patent
Lai et al.

(10) Patent No.: US 12,596,267 B2
(45) Date of Patent: *Apr. 7, 2026

(54) CAMERA ASSEMBLY

(71) Applicants:Cambridge Mechatronics Limited, Cambridge (GB); Hutchinson Technology Incorporated

(72) Inventors: Chee Keong Lai, Hutchinson, MN (US); James Howarth, Cambridge (GB); Peter Francis Ladwig, Hutchinson, MN (US); Richard Rodger Jenneke, Hutchinson, MN (US); Robin Eddington, Cambridge (GB); Stephen Matthew Bunting, Cambridge (GB)

(73) Assignees: Cambridge Mechatronics Limited, Cambridge (GB); Hutchinson Technology Incorporated

( * ) Notice: Subject to any disclaimer, the term of this patent is extended or adjusted under 35 U.S.C. 154(b) by 384 days.

This patent is subject to a terminal disclaimer.

(21) Appl. No.: 17/984,847

(22) Filed: Nov. 10, 2022

(65) Prior Publication Data

US 2023/0071152 A1     Mar. 9, 2023

Related U.S. Application Data

(60) Continuation of application No. 16/196,959, filed on Nov. 20, 2018, now Pat. No. 11,526,021, which is a
(Continued)

(30) Foreign Application Priority Data

Jul. 18, 2014    (GB) ...................................... 1412848

(51) Int. Cl.
*G02B 27/64*        (2006.01)
*G02B 7/02*         (2021.01)
(Continued)

(52) U.S. Cl.
CPC ............. *G02B 27/646* (2013.01); *G02B 7/02* (2013.01); *G02B 7/08* (2013.01); *G02B 7/09* (2013.01);
(Continued)

(58) Field of Classification Search
CPC . G02B 7/00; G02B 7/003; G02B 7/02; G02B 7/021; G02B 7/023; G02B 7/04;
(Continued)

(56) References Cited

U.S. PATENT DOCUMENTS 2,168,911 A     8/1939  Meyer
6,143,047 A     11/2000  Jodoin et al.
(Continued)

FOREIGN PATENT DOCUMENTS

CN          101986192 A      3/2011
CN          102770804 A      11/2012
(Continued)

OTHER PUBLICATIONS

Chinese Office Action regarding Application No. 201911354285.8 dated Apr. 6, 2021.
(Continued)

*Primary Examiner* — Thong Q Nguyen
(74) *Attorney, Agent, or Firm* — Van Hoven PC; Stefan D. Osterbur; Joshua Van Hoven

(57) ABSTRACT

A camera assembly comprises a lens assembly supported on a support structure, wherein the lens assembly includes an autofocus actuator arrangement and the camera assembly includes an optical image stabilization assembly arranged to move the lens assembly in a plane perpendicular to the optical axis. A flexible printed circuit tape connected between the support structure and the lens assembly and providing an electrical connection to the auto-focus actuator arrangement is bent around a corner, thereby allowing the
(Continued)

flexible printed circuit tape to accommodate the motion of the lens assembly perpendicular to the optical axis. A crimp plate connected to the lens assembly which crimps shape memory alloy wires has features extending out of the plane of the crimp plate for reducing flexibility. At least part of the optical image stabilization assembly overlaps the lens assembly in the direction along the optical axis, thereby reducing the height of the camera assembly.

11 Claims, 5 Drawing Sheets

Related U.S. Application Data division of application No. 15/326,865, filed as application No. PCT/GB2015/052043 on Jul. 15, 2015, now Pat. No. 10,175,499.

(51) Int. Cl.

| | | |
|---|---|---|
| *G02B 7/08* | (2021.01) | |
| *G02B 7/09* | (2021.01) | |
| *G03B 3/10* | (2021.01) | |
| *G03B 5/02* | (2021.01) | |
| *H04N 23/54* | (2023.01) | |
| *H04N 23/55* | (2023.01) | |
| *H04N 23/57* | (2023.01) | |
| *H04N 23/68* | (2023.01) | |

(52) U.S. Cl.
CPC ................. *G03B 3/10* (2013.01); *G03B 5/02* (2013.01); *H04N 23/54* (2023.01); *H04N 23/55* (2023.01); *H04N 23/57* (2023.01); *H04N 23/687* (2023.01); *G03B 2205/0015* (2013.01); *G03B 2205/0076* (2013.01)

(58) Field of Classification Search
CPC ... G02B 7/08; G02B 7/09; G02B 7/10; G02B 7/105; G02B 27/64; G02B 27/642; G02B 27/644; G02B 27/646; G03B 3/10; G03B 5/02; H01N 23/54; H01N 23/55; H01N 23/56; H01N 23/57; H01N 23/687

USPC .................................. 359/813–824, 554–557
See application file for complete search history.

(56) References Cited

U.S. PATENT DOCUMENTS

| | | | |
|---|---|---|---|
| 7,839,586 B2 | 11/2010 | Woo et al. | |
| 7,929,848 B2* | 4/2011 | Taguchi | H04N 23/6812 |
| | | | 396/55 |
| 8,559,803 B2 | 10/2013 | Huang et al. | |
| 8,720,839 B2 | 5/2014 | Lijesnic | |
| 10,175,499 B2 | 1/2019 | Howarth et al. | |
| 2008/0259631 A1 | 10/2008 | Holder et al. | |
| 2011/0279916 A1 | 11/2011 | Brown et al. | |
| 2014/0055630 A1 | 2/2014 | Gregory et al. | |
| 2015/0055220 A1 | 2/2015 | Lim et al. | |
| 2015/0277140 A1* | 10/2015 | Minamisawa | G03B 5/06 |
| | | | 359/557 |
| 2015/0304561 A1 | 10/2015 | Howarth et al. | |
| 2016/0330375 A1 | 11/2016 | Sekimoto | |

FOREIGN PATENT DOCUMENTS

| | | | |
|---|---|---|---|
| CN | 103176256 A | 6/2013 | |
| EP | 2750371 A1 | 7/2014 | |
| WO | 2007/113478 A1 | 10/2007 | |
| WO | 2008/099156 A2 | 8/2008 | |
| WO | 2009/056822 A2 | 5/2009 | |
| WO | 2010/012991 A2 | 2/2010 | |
| WO | 2012/038703 A2 | 3/2012 | |
| WO | 2013/175197 A1 | 11/2013 | |
| WO | 2014/083318 A1 | 6/2014 | |
| WO | 2016/089956 A1 | 6/2016 | |
| WO | 2016/144895 A1 | 9/2016 | |

OTHER PUBLICATIONS

Second Chinese Office Action regarding Application No. 201911354285.8 dated Sep. 7, 2021.

* cited by examiner

Fig. 3

Fig. 4
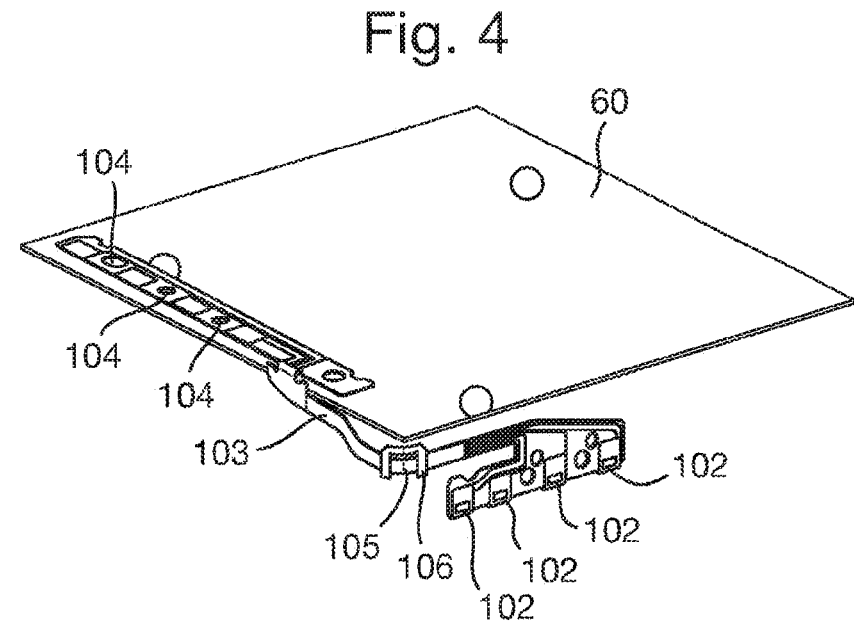
Fig. 5
Fig. 6
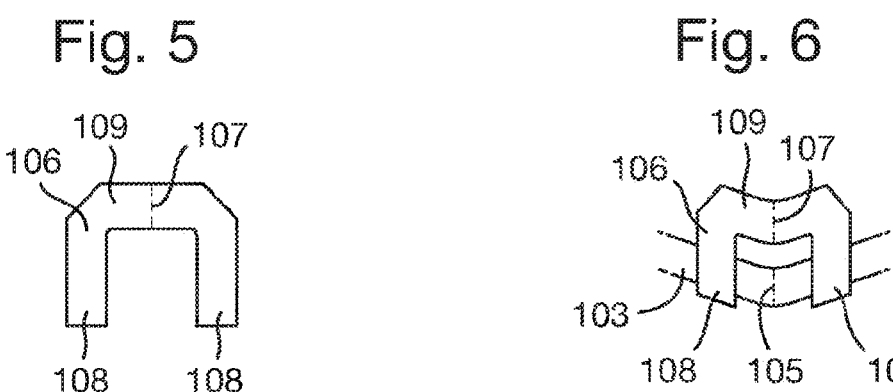
Fig. 7
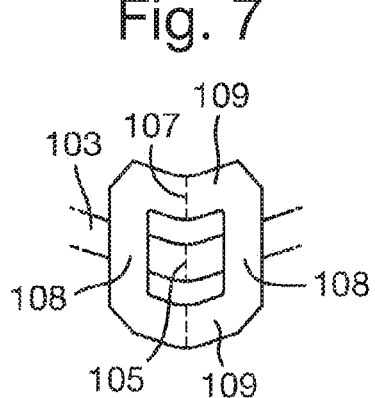

CAMERA ASSEMBLY

CROSS-REFERENCE TO RELATED APPLICATIONS

This application is a continuation of U.S. patent application Ser. No. 16/196,959, filed Nov. 20, 2018, now U.S. Pat. No. 11,526,021, which is a divisional of U.S. patent application Ser. No. 15/326,865, filed on Jan. 17, 2017, which is U.S. Pat. No. 10,175,499, which is a 371 U.S. National Stage of International Application PCT/GB2015/052043, filed Jul. 15, 2015, which claims the benefit of and priority to British Patent Application 1412848.2, filed on Jul. 18, 2014. The enter disclosures of each of the above applications are incorporated herein by reference.

FIELD

The present invention relates to a camera assembly capable of providing both an autofocus (AF) function and an optical image stabilisation (OIS) function.

BACKGROUND

The present invention is concerned with integration of the components providing the AF function and an OIS function.

By way of example, a camera assembly of this type is disclosed in WO-2013/175197 and WO-2014/083318. In the camera assembly disclosed therein, an AF function and an OIS function are provided as follows.

The lens assembly comprises a lens carriage, at least one lens having an optical axis and supported on the lens carriage in a manner allowing movement of the lens along its optical axis and an AF actuator arrangement arranged to move the lens relative to the lens carriage along the optical axis, for providing focusing.

The lens carriage is supported on the support structure in a manner allowing movement of the lens assembly relative to the support structure in a plane perpendicular to the optical axis. An OIS assembly is arranged to move the lens carriage relative to the support structure in said plane perpendicular to the optical axis. In WO-2013/75197 and WO-2014/083318, the OIS assembly comprises shape memory alloy (SMA) wires as an actuator for driving the movement, although in general other types of actuator could be used.

SMA actuator wires are known for use in miniature cameras to effect focus, zoom or optical image stabilization (OIS), as disclosed for example in WO-2013/175197 and WO-2014/083318.

A first aspect of the present invention is concerned with making of an electrical connection to the AF actuator arrangement, for example for providing power and control signals. As the AF actuator arrangement is provided on the lens assembly which is movable, such an electrical connection needs to accommodate that movement.

In this regard, WO-2014/083318 discloses making of an electrical connection through a suspension system of the OIS assembly, in particular through flexures which suspend the lens assembly on the support structure. This provides a neat and compact connection to the AF actuator arrangement. However, it has the disadvantage that only two electrical leads are provided, whereas for more advanced AF systems more than two connections are needed, for example providing leads for sensing and communications in addition to leads for ground and power.

SUMMARY

According to the first aspect of the present invention, there is provided a camera assembly comprising: a support structure; a lens assembly comprising a lens carriage, at least one lens having an optical axis and supported on the lens carriage in a manner allowing movement of the lens along its optical axis and an AF actuator arrangement arranged to move the lens relative to the lens carriage along the optical axis, wherein the lens carriage is supported on the support structure in a manner allowing movement of the lens assembly relative to the support structure in a plane perpendicular to the optical axis; and an OIS assembly arranged to move the lens carriage relative to the support structure in said plane perpendicular to the optical axis, the camera assembly further comprising a flexible printed circuit tape connected between the support structure and the lens assembly and providing an electrical connection to the AF actuator arrangement, the flexible printed circuit tape being bent around a corner.

Thus, flexible printed circuit tape connected between the support structure and the lens assembly is used to provide an electrical connection to the AF actuator arrangement. The use of flexible printed circuit tape allows multiple, for example three or more, separate electrical connections to be provided.

However, it has been appreciated that flexible printed circuit tape may in general provide insufficient accommodation of the motion of the lens carriage relative to the support structure driven by the OIS assembly, because such motion may in general be in any direction in the plane perpendicular to the optical axis, whereas flexible printed circuit tape will typically flex predominantly in a single direction, that is perpendicular to its face. Accordingly, the flexible printed circuit tape is arranged bent around a corner. As such, it can be arranged to accommodate the motion of the lens carriage relative to the support structure driven by the OIS assembly in any direction in the plane perpendicular to the optical axis.

Optionally, a bend former may be connected to the flexible printed circuit tape on each side of the corner. This provides the advantage that the bend former may constrain the bend of the flexible printed circuit tape and reduce the strain on the flexible printed circuit tape, for example without the need to plastically deform the flexible printed circuit tape to form the bend.

Alternatively according the first aspect of the present invention, there is provided a camera assembly comprising an OIS mechanism and a lens assembly including an AF mechanism, wherein the OIS mechanism causes the lens assembly to move in a plane perpendicular to the optical axis of the lens assembly, and the electrical connection from the AF mechanism to an external non-moving part comprises flexible printed circuit (FPC) tape bent around a corner. The various features of the first aspect of the invention may be applied to this alternative also.

A second aspect of the present invention is concerned with reducing the complexity and/or the height of the camera apparatus in a direction along the optical axis.

According to the second aspect of the present invention, there is provided a camera assembly comprising: a support structure; a lens assembly comprising a lens carriage, at least one lens having an optical axis and supported on the lens carriage in a manner allowing movement of the lens along its optical axis and an AF actuator arrangement arranged to move the lens relative to the lens carriage along the optical axis, wherein the lens carriage is supported on the support structure in a manner allowing movement of the lens assembly relative to the support structure in a plane perpendicular to the optical axis; and an OIS assembly comprising shape memory alloy wires arranged to move the lens carriage relative to the support structure in said plane perpendicular to the optical axis, wherein the OIS assembly comprises a crimp plate connected to the lens assembly which crimps one end of the shape memory alloy wires, the crimp plate extending in a plane and provided with at least one feature that extends out of the plane of the crimp plate for reducing flexibility of the crimp plate.

Thus, the second aspect of the present invention concerns the form of an OIS assembly that comprises a crimp plate connected to the lens assembly for crimping one end of the shape memory alloy wires. In particular the crimp plate is provided with at least one feature that extends out of the plane of the crimp plate. Such a feature may reduce the flexibility of the crimp plate. That provides significant advantage, because the reduced flexibility allows the design of the OIS assembly to be improved while still providing a desired amount of rigidity to allow handling during manufacture.

For example, in some embodiments the OIS assembly may include less components connected to the crimp plate, thereby having reduced complexity.

Similarly, in some embodiments the OIS assembly may be formed with less height in a direction along the optical axis, for example by providing less components connected to the crimp plate and/or reducing the thickness of the crimp plate or components attached thereto. Such reduction in height is important in many camera apparatuses where miniaturisation is an every increasing demand.

Alternatively according to the second aspect of the present invention, there is provided a camera assembly comprising an OIS mechanism and a lens assembly including an AF mechanism, wherein the OIS mechanism causes the lens assembly to move in a plane perpendicular to the optical axis of the lens assembly, and the lens assembly is attached to the OIS mechanism at a plate which extends to crimps attaching the SMA wires of the OIS mechanism. The various features of the second aspect of the invention may be applied to this alternative also.

A third aspect of the present invention is concerned with reducing the height of the camera apparatus in a direction along the optical axis.

According to the third aspect of the present invention, there is provided a camera assembly comprising: a support structure; a lens assembly comprising a lens carriage, at least one lens having an optical axis and supported on the lens carriage in a manner allowing movement of the lens along its optical axis and an AF actuator arrangement arranged to move the lens relative to the lens carriage along the optical axis, wherein the lens carriage is supported on the support structure in a manner allowing movement of the lens assembly relative to the support structure in a plane perpendicular to the optical axis; and an OIS assembly comprising shape memory alloy wires arranged to move the lens carriage relative to the support structure in said plane perpendicular to the optical axis, wherein at least part of the OIS assembly overlaps the lens assembly in the direction along the optical axis.

By means of the overlap thus provided, the height of the camera apparatus is reduced in the direction along the optical axis. Such reduction in height is important in many camera apparatuses where miniaturisation is an ever increasing demand.

Alternatively according to the third aspect of the present invention, there is provided a camera assembly comprising an OIS mechanism and a lens assembly including an AF mechanism, wherein the OIS mechanism causes the lens assembly to move in a plane perpendicular to the optical axis of the lens assembly, and wherein the lens assembly and OIS mechanism overlap in the direction of the optical axis. The various features of the third aspect of the invention may be applied to this alternative also.

DRAWINGS

To allow better understanding, an embodiment of the present invention will now be described by way of non-limitative example with reference to the accompanying drawings, in which:

FIG. 3 is a perspective view of the camera assembly with the can removed;

FIG. 4 is a perspective view of a flexible printed circuit tape of the camera assembly;

FIG. 5 is a plan view of a bend former for connection to the flexible printed circuit tape;

FIG. 6 is a perspective view of the bend former connected to the flexible printed circuit tape;

FIG. 7 is a perspective view of an alternative bend former;

FIG. 8 is a perspective view of a camera assembly with the can removed with an alternative form of connection at the lens assembly;

FIG. 9 is a partial cross-sectional view of a crimp plate and the lens assembly;

DETAILED DESCRIPTION

Figure 1:
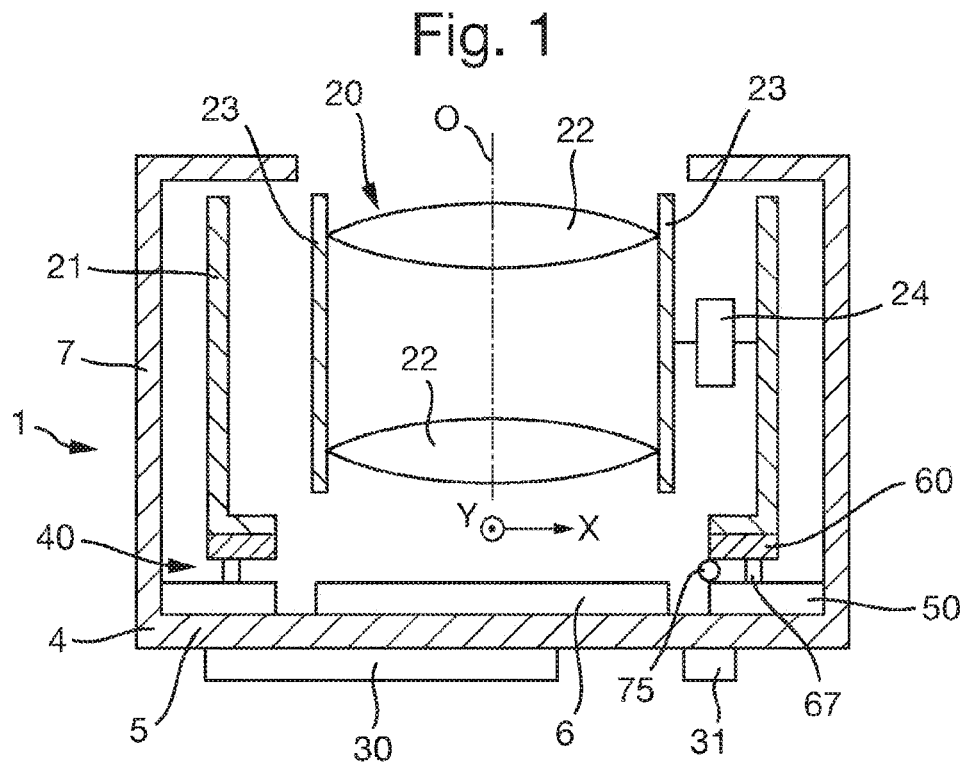
FIG. 1 is a schematic cross-sectional view of a camera assembly.

A camera assembly 1 is shown in FIG. 1 which is a cross-sectional view taken along the optical axis O. Except for some differences described below, the camera assembly 1 has the construction as the camera apparatus described in FIGS. 1 to 10 of WO-2014/083318, which is incorporated herein by reference. For brevity, a concise description of the camera assembly is provided herein, but reference is made to WO-2014/083318 for further details.

The camera assembly 1 comprises a lens assembly 20 supported on a support structure 4 by an OIS assembly 40.

The support structure 4 supports an image sensor 6 which is mounted thereon. The support structure 4 comprises a base 5, the image sensor 6 being mounted on the front side of the base 5. On the rear side of the base 5, there is mounted an IC (integrated circuit) chip 30 and also a gyroscope sensor 31. The support structure 4 also comprises a can 7 containing the camera assembly 1 and in particular the OIS assembly 40 for the purpose of encapsulation and protection.

The lens assembly 20 comprises a lens carriage 21 in the form of a cylindrical body supporting two lenses 22 arranged along the optical axis O, although in general any number of one or more lenses 22 may be provided. The camera assembly 1 is a miniature camera in which the lenses 22 have a diameter of 10 mm or less.

The lens assembly 20 is arranged to focus an image onto the image sensor 6. The image sensor 6 captures the image and may be of any suitable type, for example a CCD (charge-coupled device) or a CMOS (complimentary metal-oxide-semiconductor) device.

The lenses 22 are supported on the lens carriage 21 in the following manner so that the lenses 22 are movable along the optical axis O relative to the lens carriage 21 for providing focussing.

The lenses 22 are fixed to a lens holder 23 which is itself supported on the lens carriage 21 in a manner allowing movement of the lens holder 23 and hence the lenses 22 along the optical axis O. In this example all the lenses 22 are fixed to the lens holder 23, but in general one or more of the lenses 22 may be fixed to the lens carriage 21 and so not movable along the optical axis O relative to the lens carriage 21, leaving at least one of the lenses 22 fixed to the lens holder 23.

The lens assembly 20 also comprises an autofocus actuator arrangement 24 which is provided between the lens carriage 21 and the lens holder 23 and is arranged to drive movement of the lens holder 23 and lenses 22 along the optical axis O relative to the lens carriage 21. The autofocus actuator arrangement 24 may be any suitable type, for example being a voice coil motor (VCM) or an arrangement of SMA actuator wires, such as is described in detail in any one of WO-2007/113478, WO-2008/099156 or WO-2009/056822, which are each incorporated herein by reference, and to which reference is made for a full description.

The OIS assembly 40 supports the lens carriage 21, and hence the lens assembly 20 as a whole, in a manner allowing movement of the lens assembly 20 relative to the support structure 4 in a plane perpendicular to the optical axis O as shown by the arrows X and Y. The OIS assembly 40, in operation, moves the lens assembly 20 relative to the support structure 4 in that plane. Such movement has the effect that the image formed on the image sensor 6 is moved. This is used to provide OIS, compensating for image movement of the camera assembly 1, caused by for example hand shake.

Figure 2:
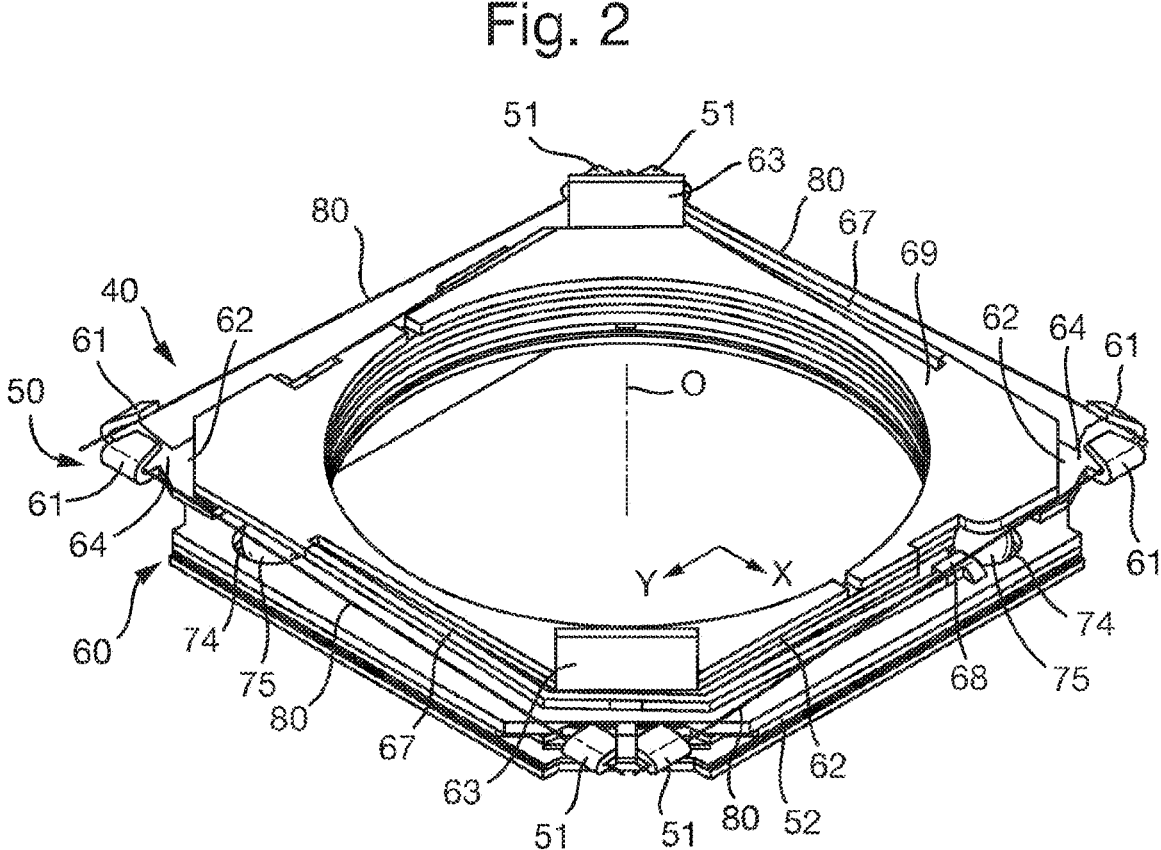
FIG. 2 is a perspective view of the OIS assembly of the camera assembly.

The construction of the OIS assembly 40 is shown in FIG. 2 and will now be described.

The OIS assembly 40 comprises (a) a movable platform 60 (shown schematically in FIG. 1 and described in more detail below) connected to the lens assembly 20, in particular to the to the lens carriage 21, and (b) a support plate 50 that forms part of the support structure 4 and is connected to the base 5.

The movable platform 60 is supported on the support plate 50 by plural balls 75 and two flexure arms 67. The support plate 50 has recesses 74 in which respective balls 75 are located and laterally retained.

In this example, three balls 75 are provided, but in general any number of balls 75 could be provided. It is preferable to provide at least three balls 75 to prevent relative tilting of the movable platform 60 and the support plate 50. Three balls 75 are sufficient to support the support plate 50 without tilting, and the provision of three balls 75 has the advantage of easing the tolerances required to maintain point contact with each ball 75 in a common plane. It would be possible to use more than three balls, for example four balls 75, which would allow a symmetrical design.

The balls 75 act as rotary bearings allowing movement of the camera lens assembly 20 relative to the support structure 4 in the plane perpendicular to the optical axis O. The balls 75 may be spherical, or may in general be any rotary element with curved surfaces that bear against the movable platform 60 and the support plate 50 and are able to roll back and forth and around in operation.

The movable platform 60 and the support plate 50 each have a laminated construction of insulator layers and metallic layers bonded by adhesive. The insulator layers may each be made of any suitable electrically insulating material, for example a polymer material such as kapton which is a polyimide material commonly used in printed circuits. The adhesive may be in any suitable form, for example adhesive-impregnated kapton or a double sided adhesive between the bonded surfaces.

The flexure arms 67 each extend between the movable platform 60 and the support plate 50. Each flexure arm 67 is provided with a base fitting 68 at the static end of the flexure arm 67. The base fitting 68 is mounted to the support plate 50 and hence to the support structure 4 as a whole. This mounting may be achieved by soldering.

Each flexure arm 67 is formed integrally with a moving fitting 69 at the moving end of the flexure arm 67. The moving fitting 69 is a plate that is laminated into the movable platform 60, and hence mounted to the camera lens assembly 20. The moving fitting 69 bears on the balls 75 which are thereby disposed between the support structure 4 and the camera lens assembly 20 and act as rotary bearings.

The flexure arms 67 are arranged as follows to provide their mechanical function. Each flexure arm 67 is an elongate beam connected between the support structure 4 and the camera lens assembly 20.

The flexure arms 67, due to their intrinsic resilience, bias the support structure 4 and the camera lens element 20 against the balls 75, the biasing force being applied parallel to the optical axis O. This maintains the contact with the balls 75. At the same time, the flexure arms 67 may be laterally deflected to permit said movement of the camera lens assembly 20 relative to the support structure 4 orthogonal to the optical axis O, to permit an OIS function.

The flexure arms 67, again due to their intrinsic resilience, provide a lateral biasing force that biases the camera lens assembly 20 towards a central position. As a result, in the absence of driving of the lateral movement of the camera lens assembly 20, the camera lens assembly 20 will tend towards the central position, even in the absence of driving.

The flexure arms 67 are designed as follows to provide a suitable retaining force on the balls 75 along the optical axis O and also to permit lateral movement with a lateral biasing force. The magnitude of the lateral biasing force is kept low enough as not to hinder OIS, whilst being high enough to centre the camera lens assembly 20 in the absence of driving.

Each flexure arm 67 has a cross-section with an average width orthogonal to the optical axis O is that is greater than its average thickness parallel to the optical axis O. Each flexure arm 67 extends in an L-shape around the optical axis O, it in general being desirable that the angular extent is at least 90 degrees as measured between the ends of the flexure arm 67.

In the manufactured state of the OIS assembly 40, the flexure arms 67 are deflected from their relaxed state to provide a pre-loading force that biases the support structure 4 and the camera lens assembly 20 against the balls 75.

The flexure arms 67 are made of a suitable material that provides a good bearing, provides the desired mechanical properties and is electrically conductive. Typically the material is a metal having a relatively high yield, for example steel such as stainless steel.

The OIS assembly 40 additionally comprises a total of four SMA actuator wires 80 extending between the support plate 50 that forms part of the support structure 4 and the movable platform 60 that is connected to the lens assembly 20.

The SMA actuator wires 80 are connected at one end to the support plate 50 by crimp portions 51 formed in a layer 52 that is one of the laminated layers of the support plate 50.

The SMA actuator wires 80 are connected at the other end to the movable platform 60 by crimp portions 61 formed in a crimp plate 62. The crimp plate 62 is one of the laminated layers of the movable platform 60 and is therefore connected to the lens assembly 20. For reasons discussed in more detail below, the crimp portions 61 are shaped to extend out of the plane of the crimp plate in a direction towards the lens assembly 20. The crimp plate 62 is shaped with steps 64 to position the crimp portions 61 above the plane of the crimp plate 62 in a direction towards the lens assembly 20.

The crimp plate 62 extends in a plane. To reduce its flexibility, the crimp plate 62 is provided with plural features 63 (in general any number of one or more such features may be provided) which extend out of the plane of the crimp plate 62. In this case, the features 63 are tabs bent out of the plane of the crimp plate 62, but in general the features 63 could have alternative forms. Advantageously, the features 63 may also be used for alignment and application of adhesive during manufacture.

The reduced flexibility of the crimp plate 62 provides significant advantage, because the reduced flexibility allows the design of the OIS assembly to be improved while still providing a desired amount of rigidity to allow handling during manufacture. For example components of the movable platform 60 such as the crimp plate 62 and the moving fitting 69 that is formed integrally with the flexure arms 67 may be made thinner than otherwise. Similarly, the movable platform 60 may be formed by a lesser number of laminated components than otherwise. For example, WO-2014/083318 discloses arrangements in which the movable plate has an interface plate, which may be omitted in the present camera assembly 1. This allows reduction in the complexity and the height of the camera apparatus 1 in the direction along the optical axis O.

The crimp portions 51 and 61 crimp the SMA actuator wires 80 to hold them mechanically, optionally strengthened by the use of adhesive.

Each of the SMA actuator wires 80 is held in tension, thereby applying a force between the movable platform 60 and the support plate 50 in a direction perpendicular to the optical axis O.

The SMA actuator wires 80 have an arrangement around the optical axis O as follows. Each of the SMA actuator wires 80 is arranged along one side of the lens assembly 20 in a symmetrical arrangement. Considering each pair of SMA actuator wires 80 on adjacent sides, at the adjacent ends the SMA actuator wires are both connected to the support plate 50 or to the movable platform 60, as shown in FIG. 2. For example, the lowermost pair of SMA actuator wires 80 in FIG. 2 are attached at their adjacent ends to the support plate 50 and the leftmost pair of SMA actuator wires 80 in FIG. 2 are attached are attached at their adjacent ends to the movable plate 60. As a result, movement in any direction in the plane perpendicular to the optical axis O may be driven by actuation of the SMA actuator wires 80 in combination. Actuation of any pair of SMA actuator wires 80 on adjacent sides will move the movable platform 60 relative to the support plate 50 in a direction that bisects that pair of SMA actuator wires 80. For example, contraction of the lowermost pair of SMA actuator wires 80 in FIG. 2 will drive movement in a direction bisecting directions X and Y in FIG. 2, and so on. Movement in any direction may be achieved by actuation of appropriate SMA actuator wires 80.

As a result, the SMA actuator wires 80 are capable of being selectively driven to move the lens assembly 20 relative to the support assembly 4 to any position in a range of movement in the plane perpendicular to the optical axis O. The magnitude of the range of movement depends on the geometry and the range of contraction of the SMA actuator wires 80 within their normal operating parameters.

The position of the lens assembly 20 relative to the support assembly 4 perpendicular to the optical axis O is controlled by selectively varying the temperature of the SMA actuator wires 80. This is achieved by passing through SMA actuator wires 80 selective drive currents that provide resistive heating. Heating is provided directly by the drive current. Cooling is provided by reducing or ceasing the drive current to allow the SMA actuator wires 80 to cool by conduction, convection and radiation to its surroundings. Rapid heating and cooling of the SMA actuator wire 80 is necessary to compensate for handshake, which typically occurs at frequencies up to several Hertz. A rapid response is also needed in focus and zoom applications. For this reason, the SMA actuator wires 80 are relatively thin, typically having a diameter of the order of 25 μm, since such thin wire heats and cools very quickly.

The control of the SMA actuator wires 80 of the camera assembly 1 is effected by a control circuit implemented in the IC chip 30 and connected to each of the SMA actuator wires 80. The control circuit generates drive signals to effect OIS and supplies them to the SMA actuator wires 80. The drive signals are generated on the basis of the output signal of the gyroscope sensor 31 that detects the angular velocity of the lens assembly 20, thereby acting as a vibration sensor that detects the vibrations of the camera assembly 1. The control may be effected as described in WO-2014/083318 to which reference is made for further details.

Figure 3:
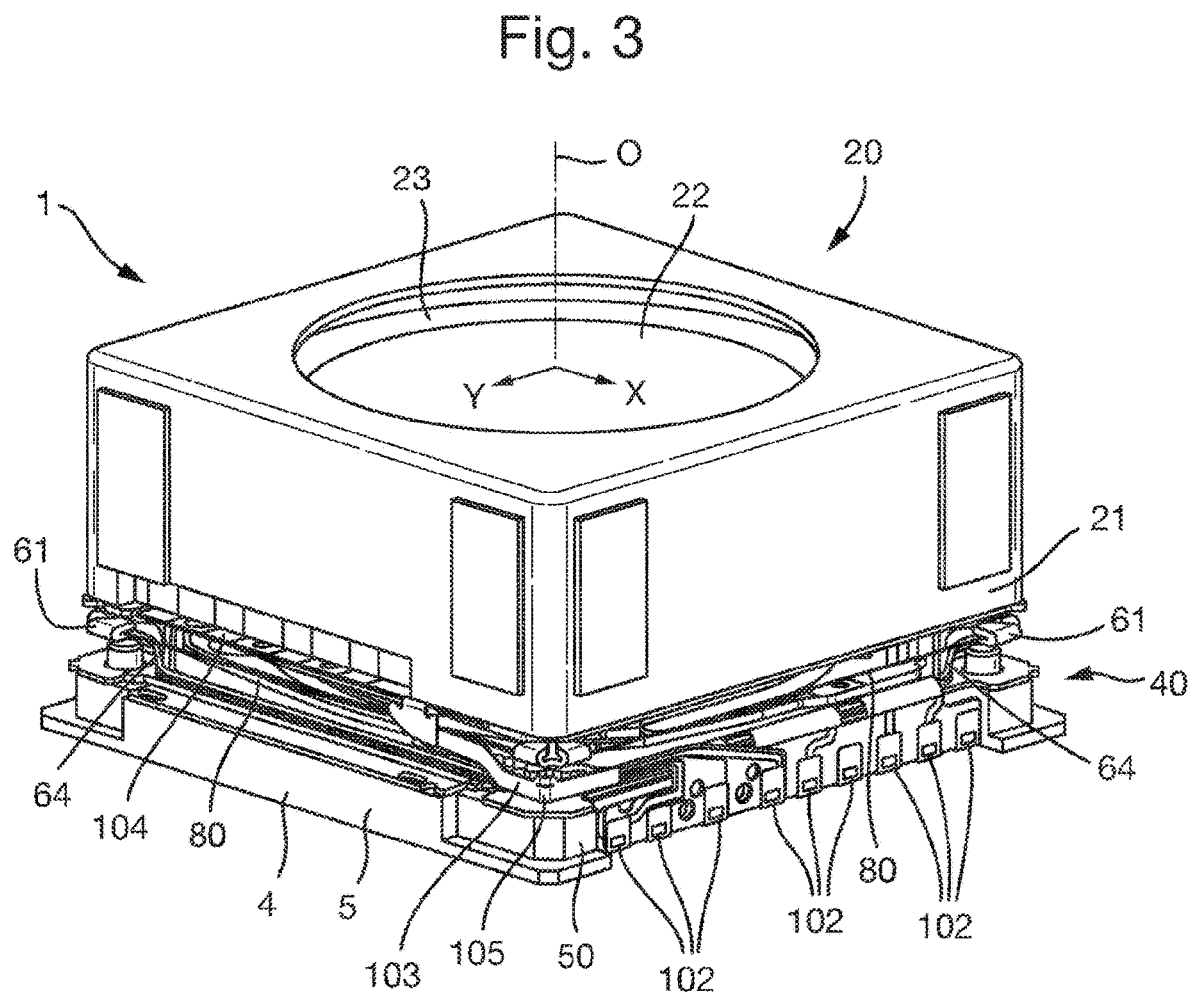

The control circuit implemented in the IC chip 30 is also electrically connected to the AF actuator arrangement 24 through a flexible printed circuit (FPC) tape 103 which is physically connected between the support structure 4 and the lens assembly 20 as shown in FIGS. 3 and 4, and is arranged as follows.

The support structure 4 has input conductive tabs 102 arranged along the base 5 on a first side of the camera assembly 1 extending transverse to direction X. Control signals from the control circuit implemented in the IC chip 30 and power from an external supply are supplied to the input conductive tabs 102. Similarly, the movable platform 60 which is fixed to the lens assembly 20 has output conductive tabs 104 arranged on a second side of the camera assembly 1 extending transverse to direction Y, adjacent the first side.

The FPC tape 103 is physically and electrically connected between the input and output conductive tabs 102 and 104. In this example, the FPC tape provides four separate electrical connections between the input and output conductive tabs 102 and 104, but may in general provide any number of connections. The output conductive tabs 104 are connected to the AF actuator arrangement 24 for supplying the control signals and power thereto. Optionally, sensor signals may be supplied in the opposite direction through electrical connections on the FPC tape 103 from the AF actuator assembly 24 to the control circuit implemented in the IC chip 30.

The FPC tape 103 may have a conventional construction, for example comprising a flexible substrate made of a suitable material, for example a plastic such as polyimide, PEEK or polyester.

The FPC tape 103 extends from the input conductive tabs 102 along the first side, and is then bent around a corner 105 before extending to the output conductive tabs 104 along the second side.

As the flexible printed circuit tape is arranged bent around the corner 105, it accommodates the motion of the lens assembly 20 relative to the support structure 4 in any direction in the plane perpendicular to the optical axis O. An FPC tape will typically flex in a single direction perpendicular to its face, while resisting motion in other directions transverse to its face or along its length. However, as the FPC tape 103 is bent, the two parts of the FPC tape 103 on each side of the corner 105 can accommodate motion in different directions with minimal strain. That is, the part of the FPC tape 103 on the first side can accommodate motion of the lens assembly 20 in direction X and the part of the FPC tape 103 on the second side can accommodate motion of the lens assembly 20 in direction Y.

In this example, the corner 105 is of 90 degrees and extends along an axis parallel to the optical axis O. This is advantageous because it provides the best accommodation of motion of the lens assembly 20 relative to the support structure 4 in the plane perpendicular to the optical axis O, although other configurations with a bend around a corner may provide similar effects.

Optionally, the FPC tape 103 may be connected to a bend former 106 as shown in FIGS. 4 to 6, although the bend former 106 is not shown in FIG. 3 for clarity. The bend former 106 is connected to the FPC tape 103 on each side of the corner 105.

More specifically, the bend former 106 is shaped to comprise two mount portions 108 and a bridge portion 109. The mount portions 108 are connected to the FPC tape 103 at separated locations on each side of the corner 105, as best seen in FIG. 6. The bridge portion 109 extends between the mount portions 108 outside the FPC tape 103 and so without being connected to the FPC tape 103.

In an alternative form shown in FIG. 7, the bend former 106 may comprise two bridge portions 109 extending between the mount portions 108 outside the FPC tape 103 on opposite sides of the FPC tape 103.

The bend former 106 constrains the bending of the FPC tape 103 and accurately locates the corner 105. In particular, the corner 105 may be formed without the need to plastically deform the FPC tape 103. This reduces the strain on the FPC tape 103 which might otherwise be caused by the corner 105. Similarly, the bend former 106 keeps the two parts of the FPC tape 103 on each side of the corner 105 flat and prevents bowing of the tape, contact with the walls of the can 7 and interference with movement.

The bend former 106 may advantageously be formed from metal, although in general any material providing appropriate structural properties could be used, for example a plastic.

The bend former 106 may be formed from a sheet, for example a sheet of metal. In this case, the bend former 106 may initially be planar and then be shaped by plastically deforming the bridge portion 109 along an axis 107 which after connection to the FPC tape 103 is parallel to the corner 105.

In FIGS. 3 and 4, the output conductive tabs 104 are shown lying horizontally on the movable platform 60. Typically, the output conductive tabs 104 would be formed on to the upper portion of the OIS assembly 40 for ease of connection to the AF actuator assembly 24. As an alternative shown in FIG. 8, the FPC tape 103 may be provided with connector tabs 109 for connection to custom tabs 110 provided on the external surface of the lens carriage 21 of the lens assembly 20 and therefore lying vertically. In this case, the lens assembly 20 may bear the connector tabs 109 of the FPC 103. In manufacture, the lens assembly 20 bearing the custom tabs 110 is attached to the OIS assembly 40 bearing the FPC tape 103, and the connector tabs 109 of the FPC 103 are then connected to the custom tabs 110 on the lens assembly 20.

Figures 8, 9:
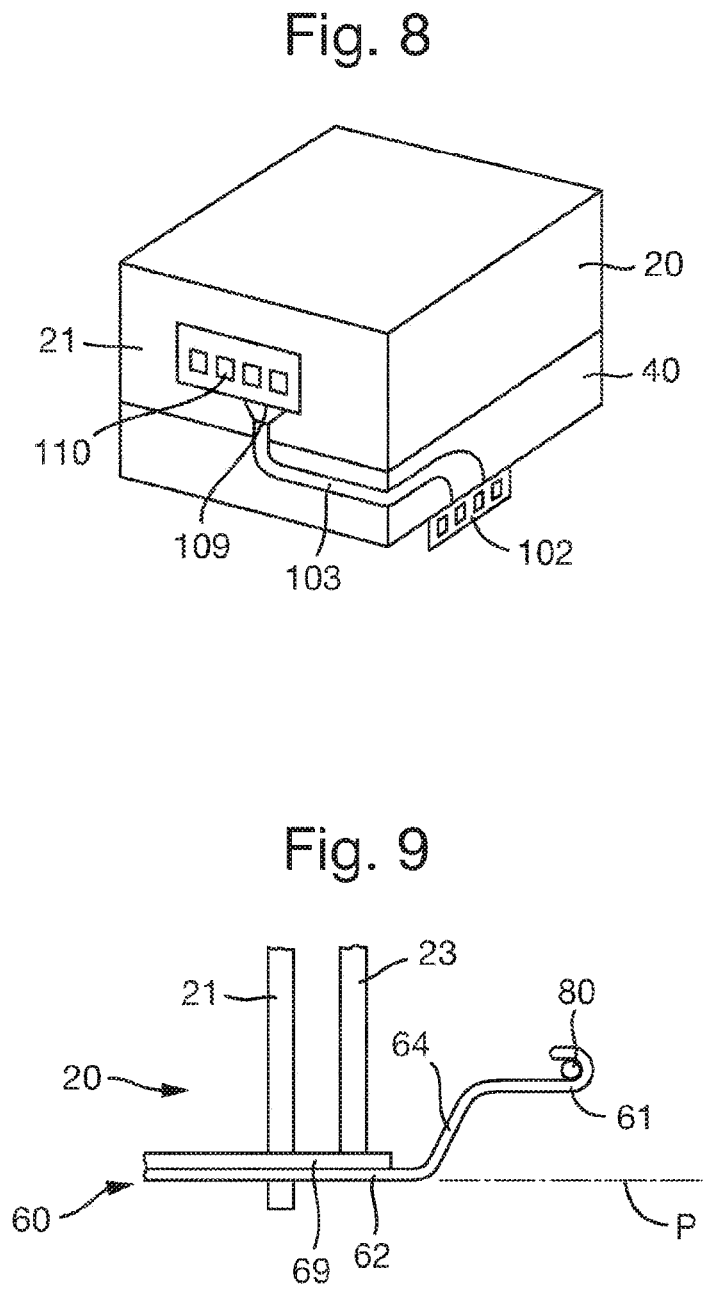

There will now be discussed the reason why the crimp plate 62 is shaped with steps 64 to position the crimp portions 61 above the plane P of the crimp plate 62 in a direction towards the lens assembly 20, as shown in FIG. 9. This has the result of shifting the lens assembly 20 relative to the OIS assembly 40 such that part of the OIS assembly 40 overlaps the lens assembly 20 in the direction along the optical axis O, that overlapping part of the OIS assembly including the SMA actuator wires 80. The overlap is with the lens holder 23 and also with the lens carriage 21. Such an overlapping arrangement contrasts with the camera disclosed in WO-2014/083318 wherein the lens assembly is simply stacked on the OIS assembly.

Herein, the references to the direction of the overlap being along the optical axis O has its normal meaning of being the direction in which the overlap occurs, that is an overlap as viewed perpendicular to the optical axis O. Consequently, the height of the camera apparatus 1 in the direction along the optical axis O may be reduced. Such a reduction in height is very significant as miniaturisation is an ever increasing demand. The height is particularly significant in many electronic devices, for example smart phones, where there is a demand for the thickness of the device to be reduced. The reduction in height is achieved at the expense of increasing the footprint perpendicular to the optical axis O, but reducing the height is generally of greater importance.

Figure 10:
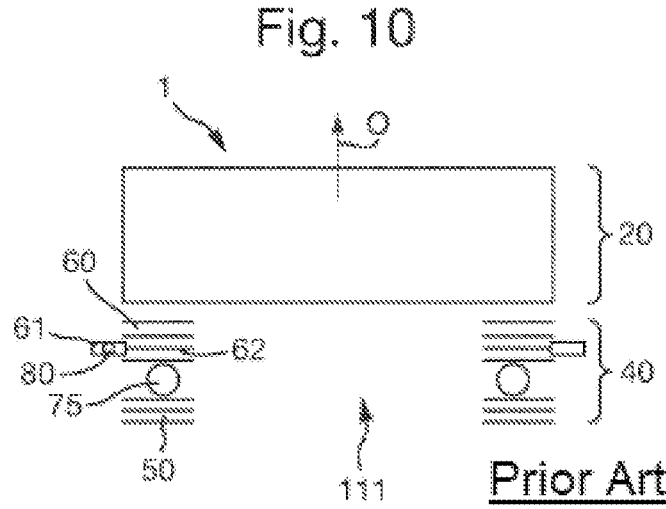
FIG. 10 is a schematic cross-sectional view of a comparative example of a camera assembly.
Figure 11:
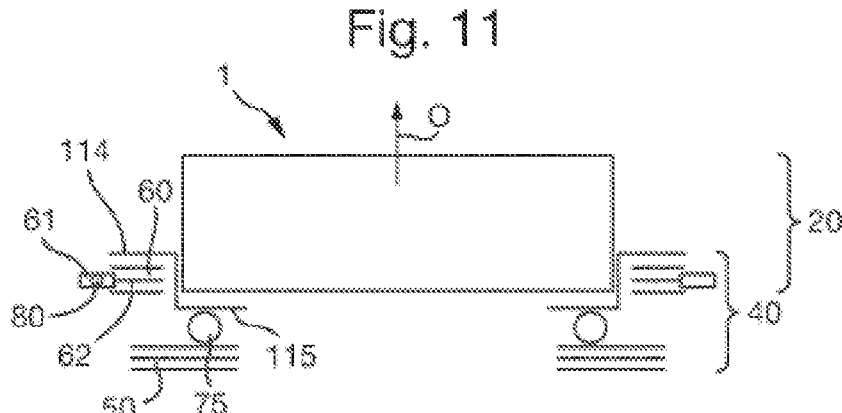
FIGS. 11 and 12 are schematic cross-sectional views of camera assemblies achieving a height reduction compared to the comparative example of FIG. 10.
Figure 12:
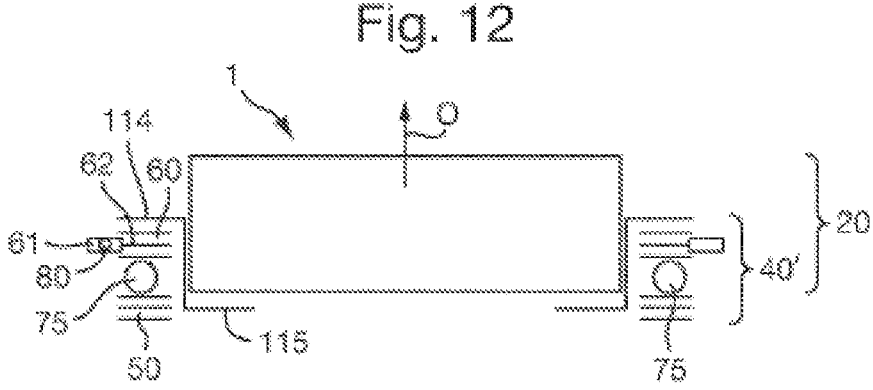

Some further alternative constructions for the camera assembly 1 which achieve a similar height reduction by a similar overlap now be described with reference to FIGS. 10 to 12 which illustrate alternative constructions for the camera assembly 1. Except for the modifications described below, in each of the alternative constructions the camera assembly 1 has the same arrangement as discussed above and common reference numerals will be used for common components. In particular, FIGS. 10 to 12 show the OIS assembly 40 comprising the support plate 50, the movable platform 60, the SMA actuator wires 80 and the balls 75. The support plate 50 and the movable platform 60 are illustrated as comprising plural laminated layers including the crimp plate 62 that include the crimp portions 61 that crimp the SMA actuator wires 80. In the constructions of FIGS. 10 to 12, the crimp plate 62 is formed without the steps 64, so that the crimp portions 61 are in the plane of the remainder of the crimp plate 62.

FIG. 10 illustrates a construction of the camera assembly 1 that is a comparative example in which the lens assembly 20 is stacked on the OIS assembly 40 in a similar manner to WO-2014/083318. As a result the OIS assembly 40 does not overlap the lens assembly 20. FIG. 10 shows that the support plate 50 and the movable platform 60 are annular, enclosing an aperture 111 through which light from the lens assembly 20 is transmitted to the image sensor (not shown in FIG. 10). The crimp plate 62 and the SMA actuator wires 80 are higher up (in a direction along the optical axis O towards the lens assembly 20) the laminate stack of the support plate 50 and the movable platform 60 than the balls 75.

FIG. 11 illustrates a construction of the camera assembly 1 in which part of the OIS assembly 40 overlaps the lens assembly 20 in the direction along the optical axis O. In this case, that overlapping part of the OIS assembly 40 includes the SMA actuator wires 80 and the movable platform 60, but not the balls 75 and the support plate 50. To accommodate this overlap, the movable platform 60 comprises, as its uppermost layer, a cradle 114 having a step 115 offset from the remainder of the cradle 114 in a direction along the optical axis O away from the lens assembly 20 and on which the lens assembly 20 is mounted. FIG. 11 shows the partial overlap of the OIS assembly 40 and the lens assembly 20 along the optical axis O. This provides a small reduction in height and some increase in footprint, to accommodate the movable platform 60 outboard of the lens assembly 20.

FIG. 12 illustrates a construction of the camera assembly 1 in which all of the OIS assembly 40, including the balls 75 and the support plate 50, overlaps the lens assembly 20 in the direction along the optical axis O. In this case, the OIS assembly 40 is almost entirely outboard of the lens assembly 20. FIG. 11 shows the total overlap of the OIS assembly 40 and the lens assembly 20 along the optical axis O. To accommodate this overlap, the movable platform 60 comprises a cradle 114 in a similar configuration to that of FIG. 11, except that the step 115 provides a larger offset from the remainder of the cradle 114. This construction provides a very significant height saving, as the ball 75 might typically measure around 0.6 mm in which case a height reduction of about 1 mm might be achieved.

What is claimed is:

1. An assembly comprising:
    a support structure defining a primary axis;
    a movable platform which is supported on the support structure in a manner allowing movement of the movable platform relative to the support structure in a plane perpendicular to the primary axis;
    an actuator assembly arranged to move the movable platform relative to the support structure in the plane perpendicular to the primary axis; and
    a flexible printed circuit tape that flexes predominantly in a direction perpendicular to its face, the flexible printed circuit tape being connected between the support structure and movable platform and configured to provide an electrical connection to the movable platform, the flexible printed circuit tape being bent around a corner extending along an axis parallel to the primary axis such that a first part of the flexible printed circuit tape is configured to flex in a first direction perpendicular to the primary axis, and a second part of the flexible printed circuit tape is configured to flex in a second direction perpendicular to the primary axis, the second direction different from the first direction.

2. The assembly according to claim 1, wherein the flexible printed circuit tape is bent around a corner of 90 degrees.

3. The assembly according to claim 1, further comprising a bend former connected to the flexible printed circuit tape on each side of the corner.

4. The assembly according to claim 3, wherein the bend former is made of metal.

5. The assembly according to claim 4, wherein the bend former comprises two mount portions connected to the flexible printed circuit tape at separated locations on each side of the corner and at least one bridge portion extending between the mount portions without being connected to the flexible printed circuit tape.

6. The assembly according to claim 5, wherein the at least one bridge portion extends between the mount portions outside the flexible printed circuit tape.

7. The assembly according to claim 6, wherein the at least one bridge portion comprises two bridge portions extending between the mount portions outside the flexible printed circuit tape on opposite sides of the flexible printed circuit tape.

8. The assembly according to claim 5, wherein the bend former is formed from a sheet in which the bridge portion has been plastically deformed.

9. The assembly according to claim 1, wherein the actuator assembly comprises shape memory alloy wires.

10. The assembly according to claim 1, further comprising an image sensor mounted to the support structure.

11. The assembly according to claim 1, wherein the actuator assembly is an optical image stabilisation assembly.

* * * * *